March 1, 1949.  L. S. HASKINS  2,463,269
DIE FOR MOLDED ARTICLES AND
METHOD OF MAKING THE SAME
Filed Feb. 16, 1945

Inventor:
Lewis S. Haskins
Owen W. Kennedy
Attorney

Patented Mar. 1, 1949

2,463,269

UNITED STATES PATENT OFFICE 2,463,269

DIE FOR MOLDED ARTICLES AND METHOD OF MAKING THE SAME

Lewis S. Haskins, Worcester, Mass.

Application February 16, 1945, Serial No. 578,313

2 Claims. (Cl. 76—107)

The present invention relates to dies for the production of molded articles and to an improved method of making such dies.

The invention has particular reference to dies for the molding of articles such as combs, wherein each die provides a large number of parallel slots for forming spaced teeth in the molded article. In dies of this general character, as previously constructed, the slots have been made by milling cutters operating on the metal of the die, while the metal is in a relatively soft condition such as will permit a machining operation. Following the cutting of the slots by the milling tools, it has been necessary to remove the burrs resulting from the cutting operation, and then to heat harden the completed die before use.

According to the present invention, it is proposed to produce an improved die of the above indicated character by first hardening the metal of the die to the desired degree, and then grinding the slots in such manner that the die is completed with the desired finish by the grinding operation. The above and other advantageous features of the invention will hereinafter more fully appear from the following description when considered in connection with the accompanying drawings, in which.

Figure 1:
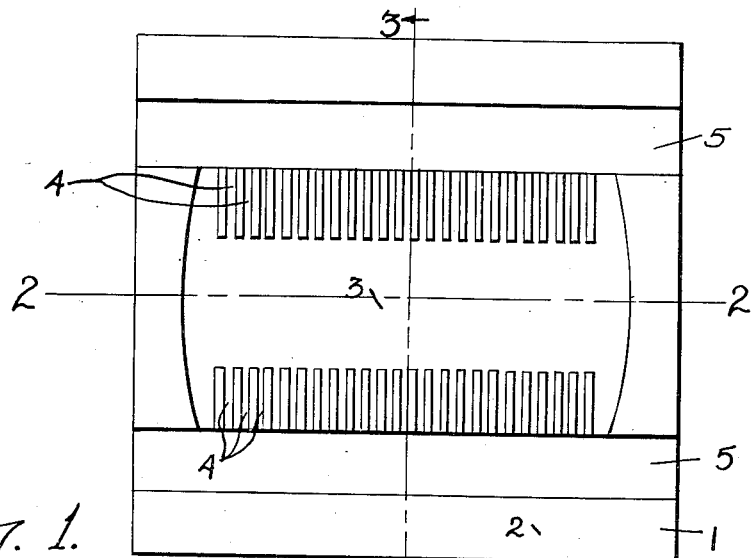
Fig. 1 is a plan view of a die embodying the present invention.
Figure 2:
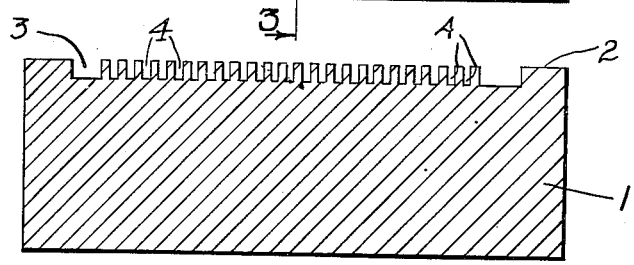
Fig. 2 is a longitudinal sectional view along the line 2—2 of Fig. 1.

Referring to the drawing, the invention is shown, for purposes of illustration, as being embodied in a die 1 for molding articles, such as combs, from any suitable moldable material in the field of plastics. While only one die is shown, it will be readily understood that a replica of the die 1 is employed in face to face relation with the die shown, when molding a completed article in accordance with usual molding practices. Therefore, a showing and description of a single die will suffice for an understanding of the present invention.

Figures 3, 5:
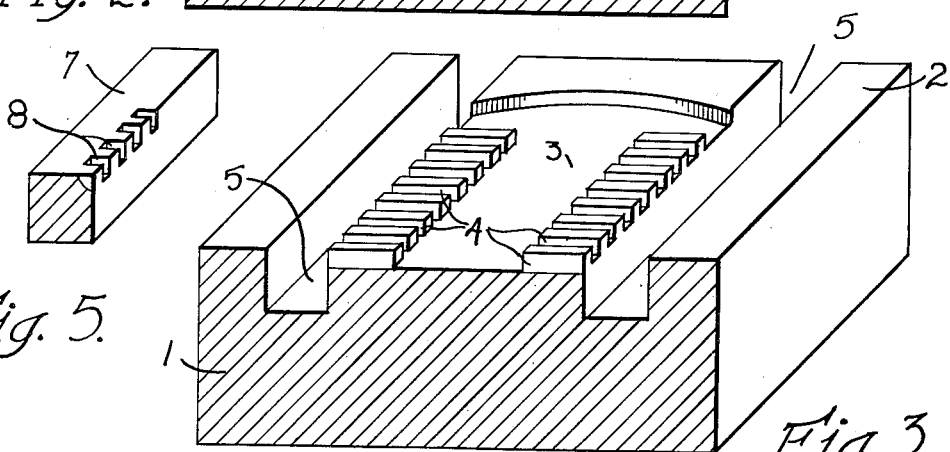
Fig. 3 is a transverse sectional view along the line 3—3 of Fig. 1, with the remainder of the die beyond the section being shown in perspective.
Fig. 5 is a sectional view, partly in perspective, of an inset employed with the die of Fig. 3.

As best shown in Fig. 3, the die 1 is in the form of a rectangular block, with its top surface 2 providing a depression 3 to receive material for forming the body of the comb. The die 1 also provides a series of parallel slots 4 extending along opposite sides of the depression 3, which slots 4 are adapted to receive material for forming the teeth of the comb. The die block further provides parallel channels 5 extending at right angles to the slots 4, the purpose of which will be later described.

In forming a die 1 in accordance with my invention, the block is cut from suitable metal stock, after which the depression 3 and the channels 5 are formed by the operation of machine tools, while the metal is in a relatively soft condition suitable for machining operations. The block then provides two parallel strips of metal extending on either side of the depression 3 and lying in the same plane as the top surface 2.

Figures 4, 6:
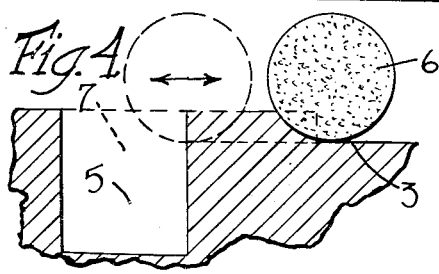
Fig. 4 is a fragmentary sectional view, on an enlarged scale, illustrating the manner of grinding the tooth slots.
Fig. 6 is a sectional view through a finished comb molded from a pair of dies embodying the invention.

The machined block for the die 1 is then subjected to a suitable heat hardening process for imparting to the metal a degree of hardness customarily employed for dies, for example, a hardness of 55 on the Rockwell scale. The next step in producing the die consists in cutting the slots 4 by means of a thin disk grinding wheel 6, operating as shown in Fig. 4. In forming each slot 4, the die block is traversed with respect to the wheel 6 a distance somewhat greater than the length of a slot, as indicated by the arrows, so that each slot is of uniform depth between the depression 3 and the channel 5. This result is made possible by the fact that the grinding wheel 6 is able to both enter and leave the work beyond the ends of the slot. Following completion of the grinding operation, the die 1 is complete and requires no further hardening or finishing.

In order to obtain rounded ends on the teeth of a comb molded from a pair of dies 1, each die further provides a pair of insets 7 for location in the channels 5. As best shown in Fig. 5, each inset 7 is in the form of a rectangular bar to fit a channel 5, with one edge of each bar provided with a series of notches 8 corresponding in number to the number of slots 4 in the die 1. As indicated in dotted lines in Fig. 4, these notches 8 are made in the inset bar 7 by the same grinding wheel 6 which makes the slots 4, with the bar being set up separately for operation upon by the wheel. It is to be noted that the bottom of each notch 8 corresponds to the curvature of the periphery of the grinding wheel 6, which curvature is drawn about a center with a radius greater than the depth of a blank slot 4. Therefore, when the insets 7 are positioned in the opposed dies 1 with their notched edges facing each other as indicated in Fig. 4, the curved end of a tooth is defined between each pair of notches 8.

A section of a complete comb molded from a pair of dies 1 is shown in Fig. 6, from which it is apparent that the central body of the comb formed by the material in the depressions 3 provides oppositely extending sets of teeth formed by material entering the series of slots 4 and notches 8 in the dies 1 and insets 7, respectively. Therefore, each comb tooth provides a smooth rounded end of uniform curvature.

I claim:

1. A molding die for the manufacture of combs from plastic material, comprising a block of hardened metal, with one surface thereof providing a centrally located depression, a channel in said block to one side of said depression and parallel to and of greater depth than said depression, a series of parallel slots extending between said central depression and said channel, with said slots being of the same depth as said depression throughout the entire length of said slots, and an inset bar received in said channel, with one edge of said bar providing a series of notches corresponding in number to the number of slots in said block, with the bottom of each notch at one end registering with a slot, and with the remainder of each notch having a curvature drawn about a center with a radius greater than the depth of a block slot.

2. A method of making a molding die, which consists in first providing the plane surface of a metal block with a molding depression and a channel of much greater depth than said depression, said depression and said channel being formed by machining operations while the metal of the block possesses a degree of hardness suitable for machining, next heat hardening said block, then forming a series of parallel slots in a face of said block between said depression and said channel by the passage of a thin disk grinding tool across said face from said depression to said channel, with said slots being of uniform depth substantially corresponding to the depth of said depression and then operating said grinding tool on an inset bar fitting said channel to form a series of notches in one edge of said bar corresponding in number to the number of slots in the die, and with each notch having a curvature determined by the periphery of said grinding tool.

LEWIS S. HASKINS.

REFERENCES CITED

The following references are of record in the file of this patent:

UNITED STATES PATENTS

| Number | Name | Date |
|---|---|---|
| 1,485,061 | Ahlgren | Feb. 26, 1924 |
| 1,598,178 | Valentine | Aug. 31, 1926 |
| 1,915,657 | Findlater | June 27, 1933 |
| 2,063,355 | Whervay | Dec. 8, 1936 |
| 2,144,525 | Dalkowitz | Jan. 17, 1939 |
| 2,144,987 | Miller | Jan. 24, 1939 |
| 2,147,899 | Hoern | Feb. 21, 1939 |
| 2,220,166 | Martin | Nov. 5, 1940 |
| 2,271,743 | Nagy | Feb. 3, 1942 |
| 2,278,815 | Winkel | Apr. 7, 1942 |
| 2,338,735 | Person | Jan. 11, 1944 |
| 2,349,977 | Mazzoni | May 30, 1944 |
| 2,367,850 | Dusevoir | Jan. 23, 1945 |

FOREIGN PATENTS

| Number | Country | Date |
|---|---|---|
| 303,388 | Italy | Nov. 30, 1932 |